US 6,576,197 B1

(12) United States Patent
Windhab et al.

(10) Patent No.: US 6,576,197 B1
(45) Date of Patent: Jun. 10, 2003

(54) METHOD AND DEVICE FOR REVEALING A CATALYTIC ACTIVITY BY SOLID MATERIALS

(75) Inventors: Norbert Windhab, Hattersheim (DE); Christian Miculka, Frankfurt (DE); Hans-Ulrich Hoppe, Frankfurt (DE)

(73) Assignee: Degussa AG (DE)

( * ) Notice: Subject to any disclaimer, the term of this patent is extended or adjusted under 35 U.S.C. 154(b) by 0 days.

(21) Appl. No.: 09/284,115

(22) PCT Filed: Sep. 26, 1997

(86) PCT No.: PCT/EP97/05278

§ 371 (c)(1),
(2), (4) Date: Apr. 8, 1999

(87) PCT Pub. No.: WO98/16949

PCT Pub. Date: Apr. 23, 1998

(30) Foreign Application Priority Data

Oct. 11, 1996 (DE) .......................................... 196 42 261

(51) Int. Cl.$^7$ ............................................... G01N 31/96
(52) U.S. Cl. ............................. 422/88; 422/83; 422/80; 422/68.1; 436/37; 436/173
(58) Field of Search ................... 436/37, 173; 250/281, 250/287; 422/88, 80, 83, 68.1

(56) References Cited

U.S. PATENT DOCUMENTS

| | | | | |
|---|---|---|---|---|
| 3,742,227 A | * | 6/1973 | Benninghoven | 250/282 |
| 3,758,777 A | * | 9/1973 | Brunnee et al. | 250/288 |
| 4,527,059 A | * | 7/1985 | Benninghoven et al. | 250/287 |
| 4,988,879 A | * | 1/1991 | Zare et al. | 250/423 P |
| 5,039,489 A | * | 8/1991 | Gleaves et al. | 422/50 |
| 5,065,018 A | * | 11/1991 | Bechtold et al. | 250/287 |
| 5,180,914 A | * | 1/1993 | Davis et al. | 250/286 |
| 5,264,183 A | * | 11/1993 | Ebner et al. | 422/83 |
| 5,376,335 A | * | 12/1994 | Gleaves | 422/68.1 |
| 5,498,545 A |   | 3/1996 | Vestal | 436/47 |
| 6,008,491 A | * | 12/1999 | Smentkowski et al. | 250/309 |
| 6,030,917 A | * | 2/2000 | Weinberg et al. | 502/104 |
| 6,063,633 A | * | 5/2000 | Willson, III et al. | 436/37 |

FOREIGN PATENT DOCUMENTS

| | | | |
|---|---|---|---|
| EP | 0266334 | | 5/1988 |
| JP | 59-178358 | | 10/1984 |
| WO | WO-00/29844 A | * | 5/2000 |

* cited by examiner

*Primary Examiner*—Jill Warden
*Assistant Examiner*—Yelena Gakh
(74) *Attorney, Agent, or Firm*—Connolly Bove Lodge & Hutz LLP

(57) ABSTRACT

The invention relates to a process for detecting the catalytic activity of solid materials, in which process one or more starting materials are brought to reaction in the presence of the solid materials, characterized in that the solid materials are present, spatially separated from one another, on a support, in that the starting materials are brought into contact with the solid materials and in that the resultant product or products are analyzed by a mass spectrometer, with resolution of location regarding the solid materials on the support.

The advantages of the process according to the invention are essentially that a rapid serial or parallel detection of the catalytic activity of solid materials under identical conditions is now possible.

9 Claims, 3 Drawing Sheets

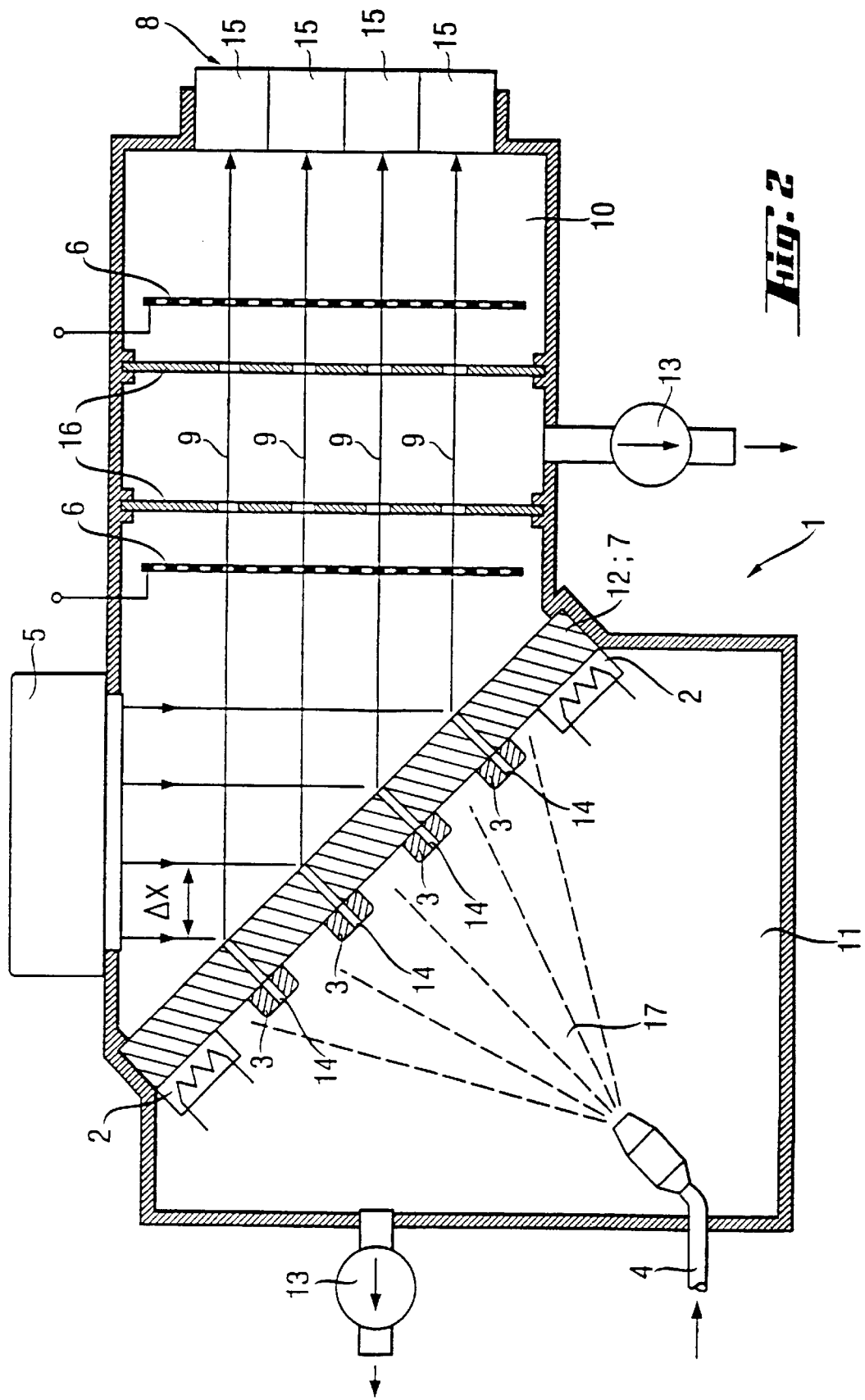

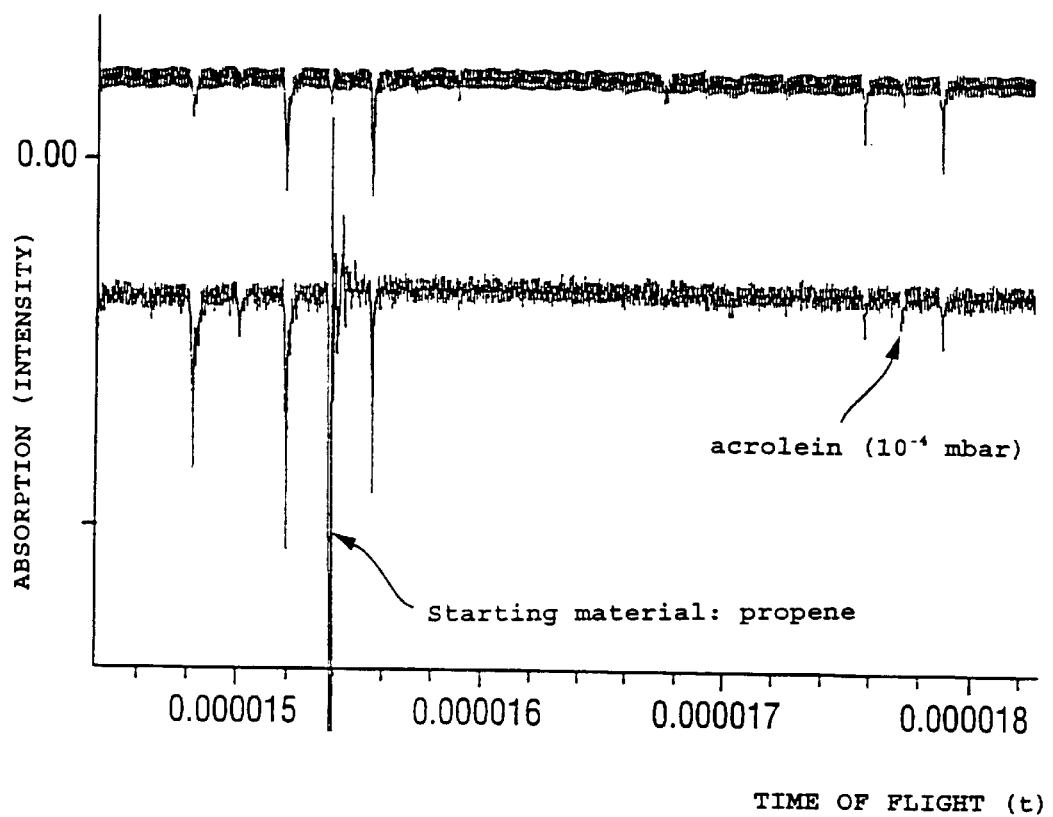
Fig. 3 MASS SPECTRUM OF AN EXAMPLE MEASUREMENT

METHOD AND DEVICE FOR REVEALING A CATALYTIC ACTIVITY BY SOLID MATERIALS

BACKGROUND OF THE INVENTION

The invention relates to a process for detecting the catalytic activity of solid materials in which process one or more starting materials are brought to reaction in the presence of the solid materials.

These processes have the disadvantages that large amounts of substances and, due to serial testing, much time for repeating steps are required. In the course of what is termed "combinatorial chemistry", libraries of substances are prepared, many substances being synthesized simultaneously, albeit in small amounts (P. G. Schultz et al., Science 1995, 1738; Michael J. Natan, J. Am. Chem. Soc. 118, 1996, 8721–8722).

SUMMARY OF THE INVENTION

The object underlying the invention was therefore to provide a process which succeeds with smaller amounts of substance than hitherto for a pure activity screening and permits more rapid examination of the solid materials.

This object is achieved by a process of the type mentioned at the outset, which is characterized in that the solid materials are present, spatially separated from one another, on a support, in that the starting materials are brought into contact with the solid materials and in that the resultant product or products are analyzed by a mass spectrometer, with resolution of location regarding the solid materials on the support.

The invention therefore relates to a process for detecting the catalytic activity of solid materials, in which process one or more starting materials are brought to reaction in the presence of the solid materials, characterized in that the solid materials are present, spatially separated from one another, on a support, in that the starting materials are brought into contact with the solid materials and in that the resultant product or products are analyzed by a mass spectrometer, with resolution of location regarding the solid materials on the support.

According to the invention, a mass spectrometer is used for the analysis. Mass spectrometers permit analysis down to a few molecules, and substance mixtures and isotope mixtures may also be analyzed directly.

A first preferred embodiment of the invention is characterized in that a plurality of solid materials, preferably more than 20, very particularly preferably more than 100, are present, separated from one another, on a support and as a result can be examined simultaneously. In a second preferred embodiment, the solid materials can be heated or cooled.

A further preferred embodiment is that the mass spectrometer is a TOF (time of flight) mass spectrometer (arrangement as described by W. C. Wiley and I. H. McLaren Rev. Sci. Instr. 26, 12 1955, 1150–1157). Preferably, for the analysis with the mass spectrometer, a Multi-Channel-Plate (MCP) detector can be used, particularly preferably a location-resolving MCP detector (MCP array with phosphor screen or fluorescent screen), since then the reactions at different positions of the abovementioned support can be analyzed simultaneously. In a further preferred embodiment of the invention, the reaction is carried out in a first vacuum chamber and the analysis in a second vacuum chamber, the two chambers being separated by an orifice plate. This permits the support to have an increased streaming rate, in order to be quite sure that sufficient starting material can be brought into contact with the solid material without increasing the spectroscopic background too greatly due to gas feed. In the analytical compartment or reaction compartment, a pressure $\leq 10^{-5}$ mbar, particularly preferably $\leq 10^{-6}$ mbar, very particularly preferably $\leq 10^{-7}$ mbar, can be set using vacuum pumps. In the reaction compartment, the true pressure immediately over the solid materials can depart from vacuum up to atmospheric pressure depending on the streaming. Solid starting materials or starting materials having a particularly low vapor pressure can also be brought into contact with the potentially catalytically active solid material directly prior to evacuation of the system by single application termed batch processes by those skilled in the art.

A further preferred embodiment is characterized in that the individual solid material or individual solid materials are present in an amount less than 1 mg, preferably less than 0.1 mg, particularly preferably less than 0.01 mg, very particularly preferably less than 0.001 mg. This permits activity screening of the substance libraries (pools) which are known from the literature and mentioned at the outset.

As additional embodiments of the analysis, a device for focusing the molecular beam can also be used, in order to permit, for example in a location-resolving detector, the assignment of the reaction products to the individual support positions (solid materials) by the orifice plate. A further additional embodiment is a low-fragmentation ionization of the products by laser pulse (T. Baumert, J. L. Herek, A. H. Zeweil J. Chem. Phys, 99(6), 1993, 4430–4440), which prevents product molecules from breaking down into lighter fragments before they reach the detector and thus falsifying the product analysis.

The advantages of the process according to the invention are essentially that a rapid serial or parallel detection of the catalytic activity of solid materials with very small amounts under identical conditions is now possible.

To carry out the processes according to the invention, an apparatus is particularly suitable which comprises one or more vacuum chambers, a catalyst support and a mass spectrometer. An apparatus is further particularly suitable which is the subject matter of the invention, having a vacuum chamber on which a mass spectrometer is arranged and which has at least one inlet for gas, characterized in that the inlet or each inlet is designed as a support for solid materials and has at least one capillary, the number of the capillaries being able to be any integer from 1 to at least 100.

A first particular design of this apparatus is characterized in that the capillary or each capillary has a diameter from the range 5 to 100, preferably 10 to 50, $\mu$m. With a suitable selection of diameter and length of the capillary (capillaries), the gas can be passed onto the solid materials even at atmospheric pressure and even at superatmospheric pressure (greater than 1 bar absolute).

A second particular design of this apparatus is characterized in that the support or each support has the shape of a plate and is inclined to the detector part of the mass spectrometer at an angle of 30 to 60°, preferably 45°.

BRIEF DESCRIPTION OF THE DRAWINGS

An embodiment of the process according to the invention is described in more detail below with reference to the sketch of the apparatuses according to the invention shown in FIGS. 1 and 2, without the intention thereby of restricting the invention in any manner.

FIG. 3 illustrates the mass spectrum of an example measurement.

DETAILED DESCRIPTION OF THE INVENTION

Figure 1:
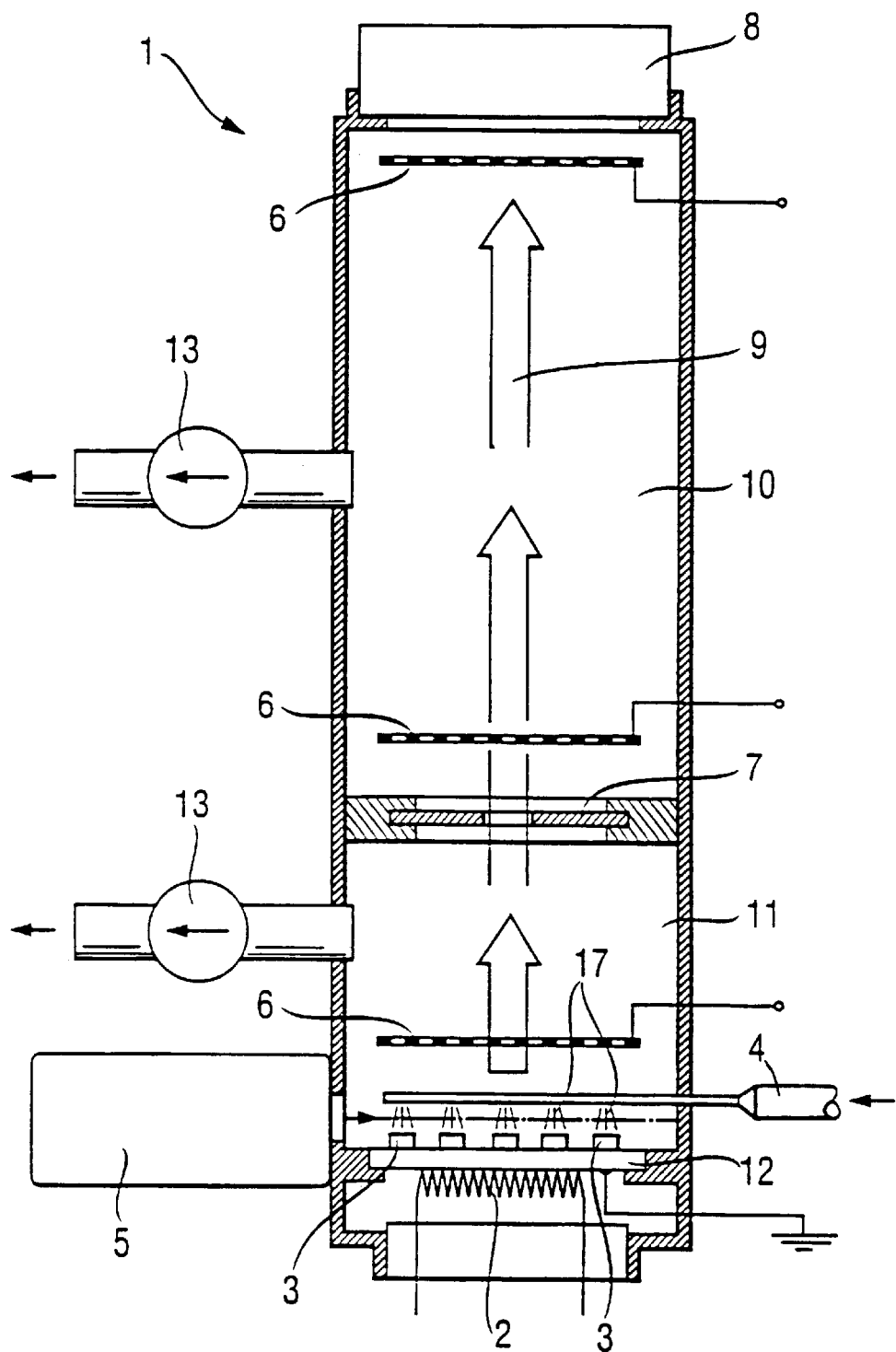

FIG. 1 shows a diagrammatic representation of an apparatus for carrying out the process according to the invention, FIG. 2 shows a basic diagram of an example of an arrangement for the location-resolving analysis, FIG. 3 shows the mass spectrum of an example measurement.

The apparatus 1 has two high-vacuum chambers 10, 11 of which especially the chamber 11 need not always be evacuated to high vacuum. The evacuation is performed by means of pumps 13. The solid materials 3 are situated on a support 12 which is equipped with a heater 2. The solid materials 3 are present spatially separated from one another, e.g. in the form of film spots. In addition, a starting material mixture capillary 4 having a plurality of orifices for applying a stream of gaseous starting materials 17 to the solid materials 3 is present, an ionization laser 5, pulsed acceleration electrodes 6 and an orifice plate 7 which, in interaction, generate a molecular (ion) beam 9 which can be analyzed by an MCP detector 8. The customary electronics for control and data capture are not shown.

Through the starting material mixture capillary 4, a gaseous starting material mixture 17 is passed onto the solid materials 3 to be examined which are situated in the high-vacuum chamber 11. It is expedient here that the capillary orifices are positioned very close to the solid material positions of the support 12. As a result, the true pressure immediately at the solid materials 3 can deviate considerably from high vacuum, depending on the starting material stream 17, up to atmospheric pressure. The contact between the starting materials 17 and a catalytically active solid material 3 forms a product or a product mixture which (in the special case) is ionized by the pulsed laser 5. The ionized molecular beam 9, which is accelerated via the pulsed (trigger) electrodes 6, is detected in the MCP detector 8. A difference in mass produces a difference in time of flight, from which a conventional mass spectrum is obtained in a known manner.

In the case of the particular design according to FIG. 2., orifice plate 7 and support 12 are combined. The product mixture passes through capillaries 14, which are situated in the orifice plate 7 (the support 12) and are continued in the solid materials and which generate a sufficiently high pressure drop between the chambers 10, 11 into chamber 10 for analysis. The detector 8 has a plurality of channels 15 which are assigned to the positions of the solid materials 3 on the support 12 by means of an orifice plate system 16. Owing to the inclined arrangement of the orifice plate 7 relative to the detector 8, via the different distances of the individual solid material positions, which differ by $\Delta X$, from the resultant time of flight t, which differs by $\Delta t$, of the individual ions, conclusions can likewise be drawn as to the position of the solid material 3 associated with the detected signal. Another possible method of determining the position is to ionize separately, using the laser, the individual solid material positions, i.e. the exits of each capillary 14. An inlet in the form of a capillary 4 supplies the starting material mixture. As in the embodiment of FIG. 1, the molecular (ion) beam is identified by reference character 9.

The experiment described below demonstrates with reference to FIG. 2, by way of example, the beneficial properties of the invention.

A known catalyst (Sohio-Kat for acrolein synthesis by air oxidation of propene) was connected on a support (12, 7) via a short capillary (14) having a diameter between 10 and 50 $\mu$m directly to a vacuum chamber (10), so that the catalyst (3) was treated at slight superatmospheric pressure with a gaseous starting material mixture 17 consisting of

| | |
|---|---|
| 30.2% by volume of | propylene 2.5 |
| 15.2% by volume of | oxygen 4.5 |
| remainder | nitrogen 5.0 | without the detector being saturated by the gas background. The entire holder was heated externally using a platinum wire coil (2) with constant feed voltage, under the control of a commercially conventional thermocouple.

For the excitation, use was made of a titanium-sapphire laser (5) with CPA amplification, which was directed via a lens (which is not shown) onto the capillary orifice in chamber 10. Detection was by a 1-inch MCP-plate, and the time of flight was recorded using a commercially conventional GHz oscilloscope.

Using known residual gas masses, the TOF-mass correlation was calibrated in the range 0–60 amu (atomic mass unit):

$$m \approx k \cdot t^2$$

$$k = \text{calibration constant in } \frac{\text{amu}}{\mu s^2}$$

where $$k \sim \frac{1}{X^2}$$

X=the distance between ion source and detector

While the product signal (acrolein) was above the residual gas spectrum background by orders of magnitude during the gas treatment, a relatively rapid decay was determined after shutting off the gas treatment. FIG. 3 shows a comparison between the smallest product content still unequivocally detectable above the residual gas 10 seconds after ending the gas treatment (bottom spectrum) and the residual gas spectrum (top spectrum). Thus the gas treatment can also be utilized for the (relatively slow) location resolution.

What is claimed is:

1. Apparatus for detecting catalytic activity of solid materials comprising a first vacuum chamber, including at least one inlet for introducing gaseous starting materials for a reaction in the presence of solid materials wherein the solid materials are spatially separated from one another on a support, and a second vacuum chamber including a laser for ionization of reaction products, an electrode, an orifice plate and a mass spectrometer for location-resolving detection of ionized products of resultant molecular ion beams, and wherein the first and second vacuum chambers are separated by the support for solid materials, and wherein the support comprises capillaries through which the products to be analyzed are introduced from the first into the second vacuum chambers and wherein the laser ionizes the products at the outlets of the capillaries.

2. Apparatus according to claim 1, wherein the inlet is a capillary with a diameter in the range 5 to 100 $\mu$m.

3. Apparatus according to claim 2, including a multichannel-plate detector for analysis with the mass spectrometer.

4. Apparatus according to claim 1, wherein the at least one support has the shape of a plate and is inclined to a detector part of the mass spectrometer at an angle of 30 to 60°.

5. Apparatus according to claim 1, wherein the mass spectrometer is a TOF mass spectrometer.

6. Apparatus for detecting catalytic activity of solid materials comprising

- a first vacuum chamber including supports for solid materials, wherein the solid materials are spatially separated from one another on the supports, and at least one inlet for introducing gaseous starting materials for a reaction in the presence of the solid materials and a laser for the ionization of reaction products, and a first electrode, and
- a second vacuum chamber including a second electrode and a mass spectrometer for location-resolving detection of ionized products of resultant molecular ion beams, and wherein the first and the second vacuum chambers are separated by an orifice plate.

7. Apparatus according to claim 6, wherein the at least one support has the shape of a plate and is inclined to a detector part of the mass spectrometer at an angle of 30 to 60°.

8. Apparatus according to claim 6, wherein the mass spectrometer is a TOF mass spectrometer.

9. Apparatus according to claim 6, including a multichannel-plate detector for analysis with the mass spectrometer.

* * * * *